United States Patent
Stronge et al.

(10) Patent No.: US 10,860,234 B2
(45) Date of Patent: *Dec. 8, 2020

(54) SIGNATURE GENERATOR FOR USE IN COMPARING SETS OF DATA IN A CONTENT ADDRESSABLE STORAGE SYSTEM

(71) Applicant: EMC IP Holding Company LLC, Hopkinton, MA (US)

(72) Inventors: William Stronge, Westford, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,807

(22) Filed: Jun. 6, 2019

(65) Prior Publication Data
US 2019/0286358 A1    Sep. 19, 2019

Related U.S. Application Data

(63) Continuation of application No. 15/662,833, filed on Jul. 28, 2017, now Pat. No. 10,359,965.

(51) Int. Cl.
*G06F 3/06* (2006.01)
(52) U.S. Cl.
CPC .......... *G06F 3/0644* (2013.01); *G06F 3/0604* (2013.01); *G06F 3/067* (2013.01)
(58) Field of Classification Search
CPC ....... G06F 3/0644; G06F 3/0604; G06F 3/067
See application file for complete search history.

(56) References Cited

U.S. PATENT DOCUMENTS

| 8,214,612 B1 | 7/2012 | Natanzon |
| 2005/0086241 A1 | 4/2005 | Ram et al. |
| 2005/0091469 A1 | 4/2005 | Chiu et al. |
| 2009/0132955 A1 | 5/2009 | Garg et al. |
| 2010/0179941 A1 | 7/2010 | Agrawal et al. |
| 2010/0293142 A1 | 11/2010 | Ackerman et al. |
| 2012/0317395 A1 | 12/2012 | Segev et al. |
| 2013/0080427 A1 | 3/2013 | Cross et al. |

(Continued)

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Ryan Bertram
(74) *Attorney, Agent, or Firm* — Ryan, Mason & Lewis, LLP

(57) ABSTRACT

An apparatus in one embodiment comprises a storage system having a plurality of storage devices configured to store at least a first set of data. The storage system is configured to generate a first signature for the first set of data and to verify equivalence between the first set of data and a second set of data by comparing the first signature to a second signature generated for the second set of data. The first and second sets of data comprise respective first and second sets of pages with each page having a content-based page identifier and a page address, and the first and second signatures are generated as respective functions of the page identifiers and page addresses of the respective first and second sets of pages. The first and second sets of data may comprise respective first and second storage volumes, respective first and second sets of multiple storage volumes, or other sets of data.

20 Claims, 6 Drawing Sheets

(56) References Cited

U.S. PATENT DOCUMENTS

| | | |
|---|---|---|
| 2013/0325824 A1 | 12/2013 | Shoens |
| 2014/0006858 A1 | 1/2014 | Helfman et al. |
| 2014/0181016 A1 | 6/2014 | Whitehead et al. |
| 2014/0201171 A1 | 7/2014 | Vijayan et al. |
| 2016/0150012 A1 | 5/2016 | Barszczak et al. |
| 2016/0202927 A1 | 7/2016 | Klarakis et al. |
| 2016/0224259 A1 | 8/2016 | Ahrens et al. |
| 2017/0052972 A1 | 2/2017 | Karuppusamy et al. |
| 2017/0185326 A1 | 6/2017 | Meiri et al. |
| 2017/0255393 A1 | 9/2017 | Yamamoto |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Rash Array," Data Sheet, 2017, 5 pages.

Itzikr, "DellEMC XtremIO X2/X1 Management, Part 1, The CAS Architecture = Simplicity?," https://xtremio.me/2017/05/08/dellemc-xtremio-x2x1-management-part-1-the-cas-architecture-simplicity/, May 8, 2017, 6 pages.

EMC Corporation, "High Availability, Data Protection and Data Integrity in the XtremIO Architecture," White Paper, Apr. 2015, 28 pages.

SIGNATURE GENERATOR FOR USE IN COMPARING SETS OF DATA IN A CONTENT ADDRESSABLE STORAGE SYSTEM

RELATED APPLICATION(S)

The present application is a continuation of U.S. patent application Ser. No. 15/662,833, filed Jul. 28, 2017 and entitled "Signature Generator for Use in Comparing Sets of Data in a Content Addressable Storage System," which is incorporated by reference herein in its entirety.

FIELD

The field relates generally to information processing systems, and more particularly to storage in information processing systems.

BACKGROUND

There are numerous storage contexts in which it is desirable to determine if one set of data is equivalent to another set of data. For example, many information processing systems are configured to replicate data from a storage system at one site to a storage system at another site. In some cases, such arrangements are utilized to support disaster recovery functionality within the information processing system. Another context in which comparison of sets of data is important is in migrating data between storage systems. In these and other contexts, a need exists for improved techniques for comparing sets of data in order to verify the correctness of data that has been replicated, migrated or otherwise copied or transferred. For example, conventional approaches to comparing sets of data can be very inefficient, particularly in the case of content addressable storage systems that are distributed over multiple storage nodes, thereby undermining the overall performance of a given data replication or data migration process in such storage systems.

SUMMARY

Illustrative embodiments provide information processing systems configured to determine if two different storage volumes, sets of storage volumes or other sets of data are equivalent by generating signatures for those sets of data and comparing the signatures. Such embodiments can advantageously provide significantly improved efficiency in verification of data replicated, migrated or otherwise copied or transferred from a source site to a target site of a given information processing system. These embodiments are therefore better able to achieve overall performance objectives for a given replication or migration process, and in numerous other contexts, including those involving content addressable storage systems that are distributed over multiple storage nodes.

In one embodiment, an apparatus comprises a storage system having a plurality of storage devices configured to store at least a first set of data. The storage system is configured to generate a first signature for the first set of data and to verify equivalence between the first set of data and a second set of data by comparing the first signature to a second signature generated for the second set of data. The first and second sets of data comprise respective first and second sets of pages with each page having a content-based page identifier and a page address, and the first and second signatures are generated as respective functions of the page identifiers and page addresses of the respective first and second sets of pages. The first and second sets of data may comprise respective first and second storage volumes, respective first and second sets of multiple storage volumes, or other sets of data.

The storage system in some embodiments is configured to group consecutive pages of the first set of data into page groups, to arrange the page groups into slices, and to assign the slices to different ones of a plurality of slice processing units of the storage system. Each of the slice processing units may be configured to generate slice signatures for each of the slices of the first set of data that are assigned to that slice processing unit, and to combine the slice signatures using a first commutative function.

The storage system is configured to generate the first signature for the first set of data by combining the combined slice signatures from the multiple slice processing units using a second commutative function. The second signature is generated for the second set of data in a similar manner, in the same storage system or possibly in another storage system.

In some embodiments involving multiple storage systems, the storage system that generates the first signature for the first set of data may comprise a storage system of a target site. The first set of data in this embodiment illustratively comprises data replicated from a different storage system of a source site in accordance with a cycle-based asynchronous replication process. The first and second signatures of the respective first and second sets of data are compared as part of a data verification phase of at least one of the cycles of the cycle-based asynchronous replication process.

The storage devices of a given one of the storage systems in some embodiments comprise non-volatile memory devices. For example, the storage devices of the storage systems of the target site and the source site in such embodiments can be configured to collectively provide respective all-flash storage arrays.

Additionally or alternatively, one or both of the storage systems may each comprise a clustered storage system having a plurality of storage nodes each having a plurality of storage devices. For example, a given storage system may be implemented in a distributed manner so as to comprise a plurality of distributed storage system components implemented on respective ones of the storage nodes of the clustered storage system. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
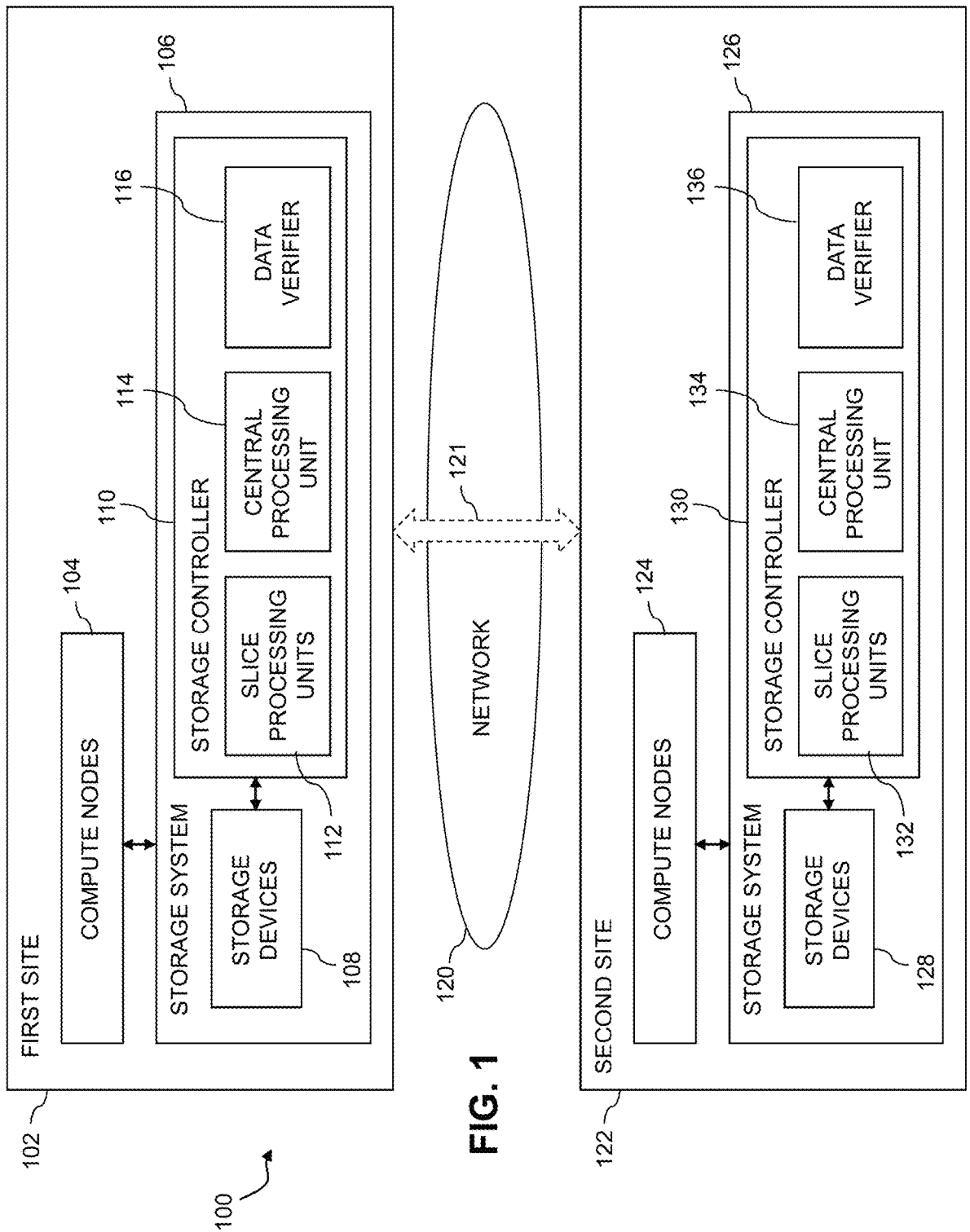
FIG. 1 is a block diagram of an information processing system comprising content addressable storage systems that include respective signature generators for use in comparing sets of data in an illustrative embodiment.

FIG. 1 shows an information processing system 100 configured in accordance with an illustrative embodiment. The information processing system 100 comprises a first site 102 having a set of compute nodes 104 coupled to a storage system 106. The storage system 106 comprises storage devices 108 and an associated storage controller 110. The storage controller 110 comprises slice processing units 112, central processing unit 114 and data verifier 116. The slice processing units 112 and central processing unit 114 collectively implement a signature generator of the storage controller 110.

The first site 102 is coupled via at least one network 120 comprising communication channels 121 to a second site 122 of the system 100. The second site 122 comprises a set of compute nodes 124 coupled to a storage system 126. The storage system 126 comprises storage devices 128 and an associated storage controller 130. The storage controller 130 comprises slice processing units 132, central processing unit 134 and data verifier 136. The slice processing units 132 and central processing unit 134 collectively implement a signature generator of the storage controller 130.

The data verifiers 116 and 136 of the respective storage controllers 110 and 130 are illustratively configured to verify the correctness of one set of data relative to another set of data based at least in part on comparison of respective signatures generated by one or more of the signature generators of the storage controllers 110 and 130. Such correctness is illustratively determined in conjunction with replication of a given set of data from one of the sites 102 and 122 to the other, migration of a given set of data from one of the sites 102 and 122 to the other, or in other contexts involving copying of data or otherwise requiring performance of signature-based data verification.

The first site 102 and the second site 122 in some embodiments comprise respective ones of a "source site" and a "target site" of an information processing system. For example, in conjunction with implementation of a cycle-based asynchronous replication process in system 100, the first site 102 may be a source site of the replicated data and the second site 122 may be a target site of the replicated data. In some embodiments, the target site comprises a disaster recovery site data center and the source site comprises a production site data center, although other arrangements are possible. It is to be appreciated, however, that illustrative embodiments are not limited to the data replication context, and can more generally be applied to other contexts in which data is copied or otherwise needs to be verified, including data migration within a given storage system or between storage systems.

It should be noted that references herein to "first" and "second" in the context of sites, sets of data and other elements or components of illustrative embodiments are intended as arbitrary labels for clarity and simplicity of description only. Alternative labeling can be used in implementing similar functionality in other embodiments. For example, although data can be replicated or migrated from first site 102 to second site 122 in some embodiments, it is also possible that data can additionally or alternatively be replicated or migrated from the second site 122 to the first site 102.

The first site 102 and second site 122 may be implemented in respective distinct local and remote geographic locations, although it is also possible for the two sites to be within a common facility or even implemented on a common processing platform.

In some embodiments, data is replicated in system 100 from the first site 102 to the second site 122 using a cycle-based asynchronous replication process. For example, asynchronous replication may be configured to periodically transfer data in multiple cycles from the first site 102 to the second site 122. The data replicated from the first site 102 to the second site 122 can include all of the data stored in the storage system 106, or only certain designated subsets of the data stored in the storage system 106. Different replication processes of different types can be implemented for different parts of the stored data.

In order to conserve bandwidth on the communication channels 121 between the first site 102 and the second site 122, data is transferred incrementally. This means that instead of sending all the data stored at the first site 102 to the second site 122 in each cycle, only the data that has been changed during each cycle is transferred. The changed data is an example of what is more generally referred to herein as "differential data." A given set of differential data transferred from the first site 102 to the second site 122 in a given one of the cycles of the cycle-based asynchronous replication process represents a "delta" between a pair of source site snapshots generated by the storage controller 110 for a corresponding pair of the cycles. Each such snapshot captures the state at a particular point in time of the data to be replicated from the first site 102 to the second site 122. It is assumed that one such snapshot is generated by the storage controller 110 in conjunction with each of the cycles of the asynchronous replication process.

A given one of the cycles of the cycle-based asynchronous replication process illustratively encompasses an amount of time spent sending a corresponding one of the sets of differential data or deltas from the first site 102 to the second site 122. There is a lag time between the data at the first site 102 and the replicated data at the second site 122. More particularly, the replicated data at the second site 122 is "older" than the data at the first site 102 by the lag time, as the compute nodes 104 continue to write to the storage system 106 after the snapshots are taken by storage controller 110 for respective ones of the cycles. For example, if the cycles of the cycle-based asynchronous replication process each take 30 seconds, then the lag time in some embodiments may vary between 30 seconds and 60 seconds. A recover point objective or RPO in some embodiments can be specified as a maximum amount of lag time that the replicated data can have.

The lag time in some embodiments is more particularly specified as an amount of time between initiation of transfer of a given one of the sets of differential data by the storage system 106 of the first site 102 and update of the corresponding snapshot by the storage system 126 of the second site 122. It is to be appreciated, however, that other specifications of the lag time can be used.

As noted above, an advantage of transferring data incrementally from the first site 102 to the second site 122 using a cycle-based asynchronous replication process is that it conserves bandwidth on the communication channels 121. For example, each byte of data written by the compute nodes 104 to the storage system 106 need only be transferred once. However, the downside is that if there is problem in any one of the cycles, the replicated data at the second site 122 will be corrupted from that point on. This is a silent corruption that without appropriate verification of the replicated data will not be discovered until compute nodes 124 are started and begin to utilize the replicated data in conjunction with disaster recovery or another similar type of recovery situation. It is therefore very important for the replicated data to be verified in an appropriate manner before such a recovery situation arises. Illustrative embodiments provide particularly efficient techniques for automatic implementation of such verification without the need for administrator intervention.

The compute nodes 104 at the first site illustratively run applications for users of the system 100 and are configured to store application data in the storage system 106. This application data is illustratively part of the data stored in storage system 106 that is replicated from the first site 102 to the second site 122. The compute nodes 124 at the second site 122 are configured to take up the running of the applications for the users of the system 100 in the event of a disaster recovery or other recovery situation. The applications on the compute nodes 124 of the second site 122 are started using the data that has been replicated to the second site 122 in the cycle-based asynchronous replication process.

The compute nodes 104 and compute nodes 124 of the respective first site 102 and second site 122 illustratively comprise respective processing devices of one or more processing platforms of the corresponding first site 102 or second site 122. For example, these compute nodes can comprise respective virtual machines (VMs) each having a processor and a memory, although numerous other configurations are possible.

At least portions of the first site 102 and second site 122 can be implemented in cloud infrastructure such as an Amazon Web Services (AWS) system. Other examples of cloud-based systems that can be used to implement at least portions of system 100 include Google Cloud Platform (GCP) and Microsoft Azure.

In some embodiments, compute and storage services may be provided for users of system 100 under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The term "user" herein is intended to be broadly construed so as to encompass numerous arrangements of human, hardware, software or firmware entities, as well as combinations of such entities.

As indicated previously, the storage systems 106 and 126 of the first and second sites 102 and 122 are configured in the present embodiment for automatic verification of asynchronously replicated data over multiple cycles of a cycle-based asynchronous replication process. This illustratively involves asynchronously replicating data from the storage devices 108 of the storage system 106 to the storage devices 128 of the storage system 126 and automatically verifying the correctness of portions of the replicated data over multiple cycles.

As will be described in more detail below, the automatic verification of the asynchronously replicated data in the present embodiment is performed in a manner that advantageously avoids the need to verify all of the transferred data in each cycle. As a result, the cycles can be made significantly more compact than would otherwise be possible. This results in enhanced efficiency in the replication process and thereby facilitates the achievement of recover point objectives in system 100.

The storage systems 106 and 126 of the first and second sites 102 and 122 may comprise respective content addressable storage systems having respective sets of non-volatile memory storage devices.

Additionally or alternatively, the storage systems 106 and 126 of the first and second sites 102 and 122 may comprise respective clustered storage systems having respective sets of storage nodes each having a plurality of storage devices.

In some embodiments, the storage systems 106 and 126 illustratively comprise scale-out all-flash storage arrays such as XtremIO™ storage arrays from Dell EMC of Hopkinton, Mass. Other types of storage arrays, including by way of example VNX® and Symmetrix VMAX® storage arrays also from Dell EMC, can be used to implement storage systems in other embodiments. A given such storage array can be configured to provide storage redundancy using well-known RAID techniques such as RAID 5 or RAID 6, although other storage redundancy configurations can be used.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

The storage devices 108 and 128 of respective storage systems 106 and 126 illustratively implement a plurality of logical units (LUNs) configured to store files, blocks, objects or other arrangements of data.

In some embodiments, the storage devices 108 and 128 comprise solid state drives (SSDs). Such SSDs are implemented using non-volatile memory (NVM) devices such as flash memory. Other types of NVM devices that can be used to implement at least a portion of the storage devices 108 and 128 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In one possible distributed implementation of a storage system, the storage system comprises a clustered storage system having a plurality of storage nodes each having a plurality of storage devices. The storage system 106 or 126 may represent a single storage node of such a clustered storage system. Alternatively, the storage system 106 or 126 may represent multiple storage nodes.

It is also possible for the storage controller 110 or 130 to be implemented in a distributed manner so as to comprise a plurality of distributed storage controller components implemented on respective ones of the storage nodes of the clustered storage system.

Although illustratively shown as being implemented within the storage system 106 or 126, the storage controller 110 or 130 in other embodiments can be implemented at least in part within another system component.

The network 120 is assumed to comprise a portion of a global computer network such as the Internet, although other types of networks can be part of the network 120, including a wide area network (WAN), a local area network (LAN), a satellite network, a telephone or cable network, a cellular network, a wireless network such as a WiFi or WiMAX network, or various portions or combinations of these and other types of networks. The network 120 in some embodiments therefore comprises combinations of multiple different types of networks each comprising processing devices configured to communicate using IP or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

In some embodiments, the storage system 126 of the second site 122 is configured to participate in a cycle-based asynchronous replication process with the storage system 106 of the first site 102. This cycle-based asynchronous replication process is illustratively implemented in system 100 by cooperative interaction of the storage systems 106 and 126 over network 120 using their respective sets of slice processing units 112 and 132, central processing units 114 and 134, and data verifiers 116 and 136. Examples of cycles of an illustrative cycle-based asynchronous replication process of this type with automatic verification will be described in more detail below in conjunction with FIG. 4.

The storage system 126 of the second site 122 is more particularly configured in some embodiments to receive from the storage system 106 of the first site 102, in respective ones of a plurality of cycles of the cycle-based asynchronous replication process, corresponding sets of differential data representing respective deltas between pairs of source site snapshots for respective pairs of the cycles. The source site snapshots are generated by the storage controller 110 of the first site 102.

The storage system 126 of the second site 122 illustratively utilizes the sets of differential data received in the respective ones of the cycles to update respective target site snapshots for those cycles. The target site snapshots are generated by the storage controller 130 of the second site 122.

Over multiple ones of the cycles, the storage system 126 of the second site 122 generates target site signatures for respective different portions of a designated one of the updated target site snapshots. The target site signatures are generated by the signature generator of the storage controller 130. The storage system 126 also receives from the storage system 106 of the first site 102 corresponding source site signatures for respective different portions of a designated one of the source site snapshots. The source site signatures are generated by the signature generator of the storage controller 110. The storage system 126 compares the target site and source site signatures over the multiple cycles in order to verify that the designated target site and source site snapshots are equivalent.

The verification of equivalence of the designated target site and source site snapshots in this embodiment is therefore spread over the multiple cycles, with pairs of target site and source site signatures for the different portions of those snapshots being compared in respective ones of the multiple cycles.

Terms such as "equivalent" and "equivalence" as used herein in conjunction with signature-based verification of data are intended to be broadly construed to encompass various arrangements for confirming that one set of data is an accurate and correct version of another set of data. Such equivalence herein is a type of functional equivalence. For example, in the case of a set of data replicated from the first site 102 to the second site 122, the replicated data when utilized by one or more applications running on the compute nodes 124 will produce the same results that would be produced by the corresponding source site data when utilized by one or more applications running on the compute nodes 104.

It is also important to note that the transferring of the data in cycles in this embodiment is separate from the verifying of the transferred data. The data transferred each cycle comprises the above-noted delta between two snapshots taken at respective ones of two different points in time. The data verification illustratively involves selecting a particular one of the target site snapshots, and then verifying the data in that snapshot over multiple cycles through the comparison of target site signatures for different portions of the selected target site snapshot to corresponding source site signatures.

The transferred data comprising the deltas sent from the first site 102 to the second site 122 are not verified in each cycle.

Further details regarding automatic verification of asynchronously replicated data will be described below in conjunction with FIG. 4.

The signatures generated by the respective storage controllers 110 and 130 for use in signature-based data verification in illustrative embodiments will now be described in greater detail with reference to FIG. 2.

Figure 2:
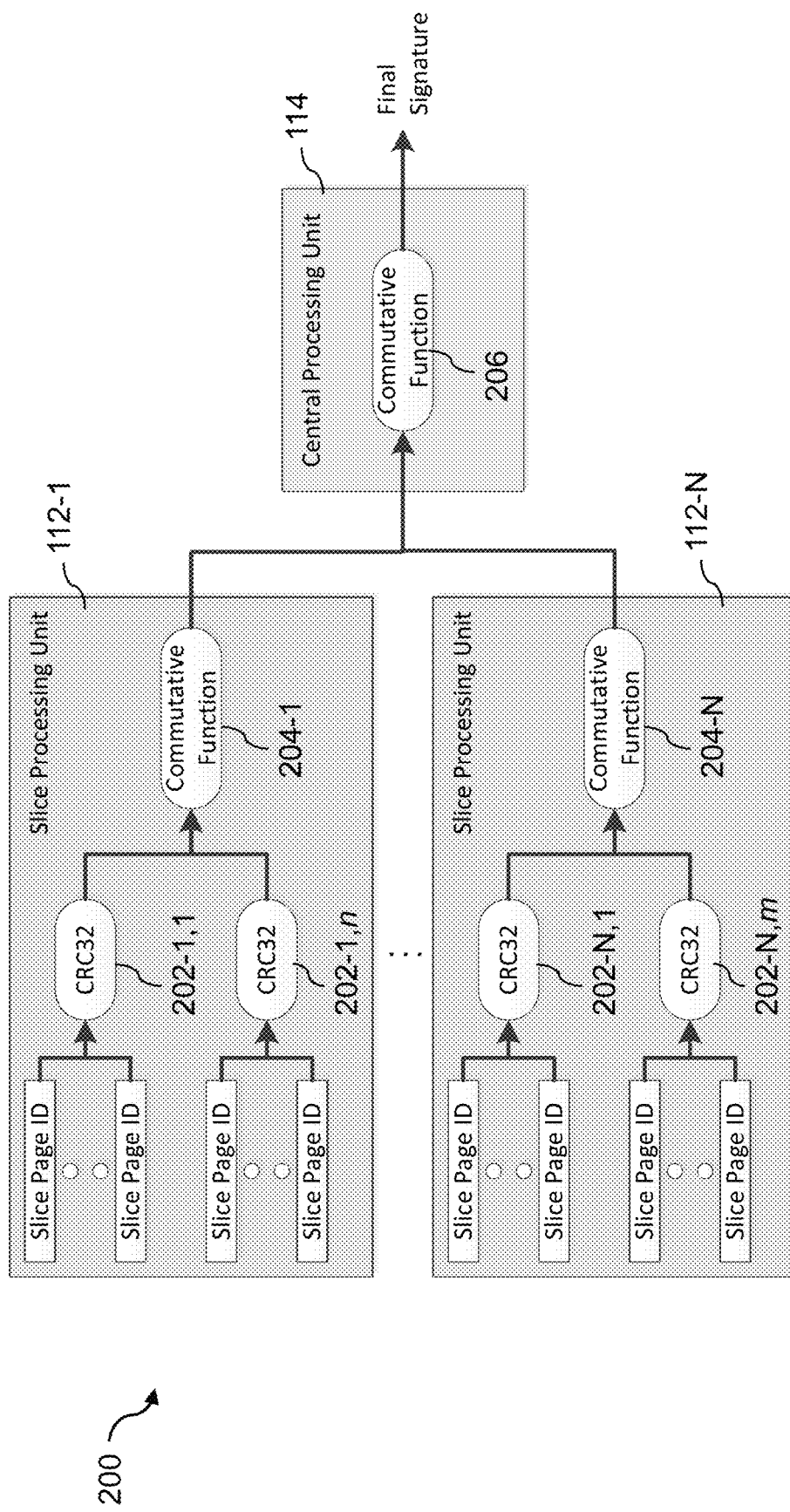
FIG. 2 is a block diagram showing a more detailed view of a signature generator implemented in a given one of the content addressable storage systems of FIG. 1.

FIG. 2 shows a signature generator 200 that is implemented by the storage controller 110 of first site 102. It is assumed that a similar signature generator is implemented by the storage controller 130 of second site 122.

The signature generator 200 in this embodiment is implemented by a set of N slice processing units 112 and the central processing unit 114 of the storage controller 110. It generates a signature for a set of data stored in the storage devices 108. The signature for the set of data can be supplied to the storage controller 130 of the second site for use in verifying data replicated from the first site 102 to the second site 122.

The signature generated by the signature generator 200 in the present embodiment is generated from a set of data comprising a set of pages with each page having a content-based page identifier and a page address. For example, the page identifiers may be generated as respective cryptographic hash functions of the data in the respective corresponding pages.

The storage system 106 in such an embodiment is more particularly implemented as a content addressable storage system. The slice processing units 112 are illustratively implemented by respective ones of a plurality of storage nodes in a distributed implementation of the content addressable storage system.

In the content addressable storage system, consecutive pages of the set of data are grouped by the storage controller 110 into page groups. The page groups are arranged into slices, and the slices are assigned to different ones of the slice processing units 112 of the storage controller 110. Each of the slice processing units 112-1 through 112-N of the signature generator 200 in this embodiment is configured to generate slice signatures for each of the slices of the set of data that are assigned to that slice processing unit, and to combine the slice signatures using a commutative function.

The slice signatures for the respective slices are generated by applying a particular cyclic redundancy check (CRC) function to the page identifiers and page addresses of the pages of those slices. The CRC function utilized in this embodiment is a 32-bit CRC ("CRC32") function, although other CRC functions or more generally cryptographic hash functions may be used in other embodiments.

Accordingly, a given one of the slice signatures is generated in the corresponding one of the slice processing units 112 as a CRC function or other cryptographic hash function of an identifier of the set of data and a plurality of page identifier and page address pairs of the given slice. The identifier of the set of data in some embodiments illustratively comprises a LUN identifier or other storage volume identifier.

Additional page processing can be implemented by the storage controller 110 in conjunction with generation of a signature in the signature generator 200. For example, the storage controller 110 may be configured to detect pages in the set of data that are all-zero pages, and to generate the signature for the set of data without utilizing the detected all-zero pages. Such functionality can be implemented at least in part within the signature generator 200 in some embodiments.

With more particular reference now to the configuration of the signature generator 200 in the FIG. 2 embodiment, the first slice processing unit 112-1 comprises CRC32 units 202-1,1 through 202-1,n and a commutative function module 204-1 that receives the slice signature outputs from each of the CRC32 units 202-1,1 through 202-1,n.

Similarly, the final slice processing unit 112-N comprises CRC32 units 202-N,1 through 202-N,m and a commutative function module 204-N that receives the slice signature outputs from each of the CRC32 units 202-N,1 through 202-N,m.

Figure 5:
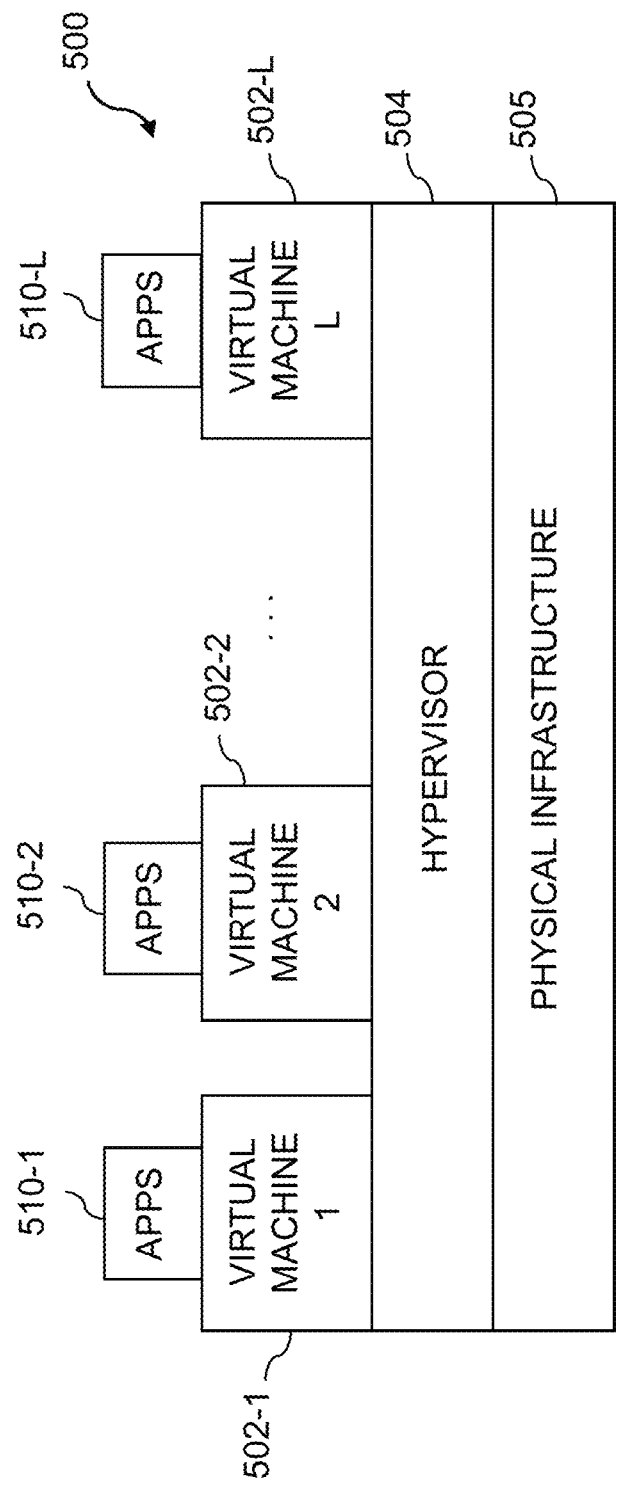
FIGS. 5 and 6 show examples of processing platforms that may be utilized to implement at least a portion of an information processing system in illustrative embodiments.
Figure 6:
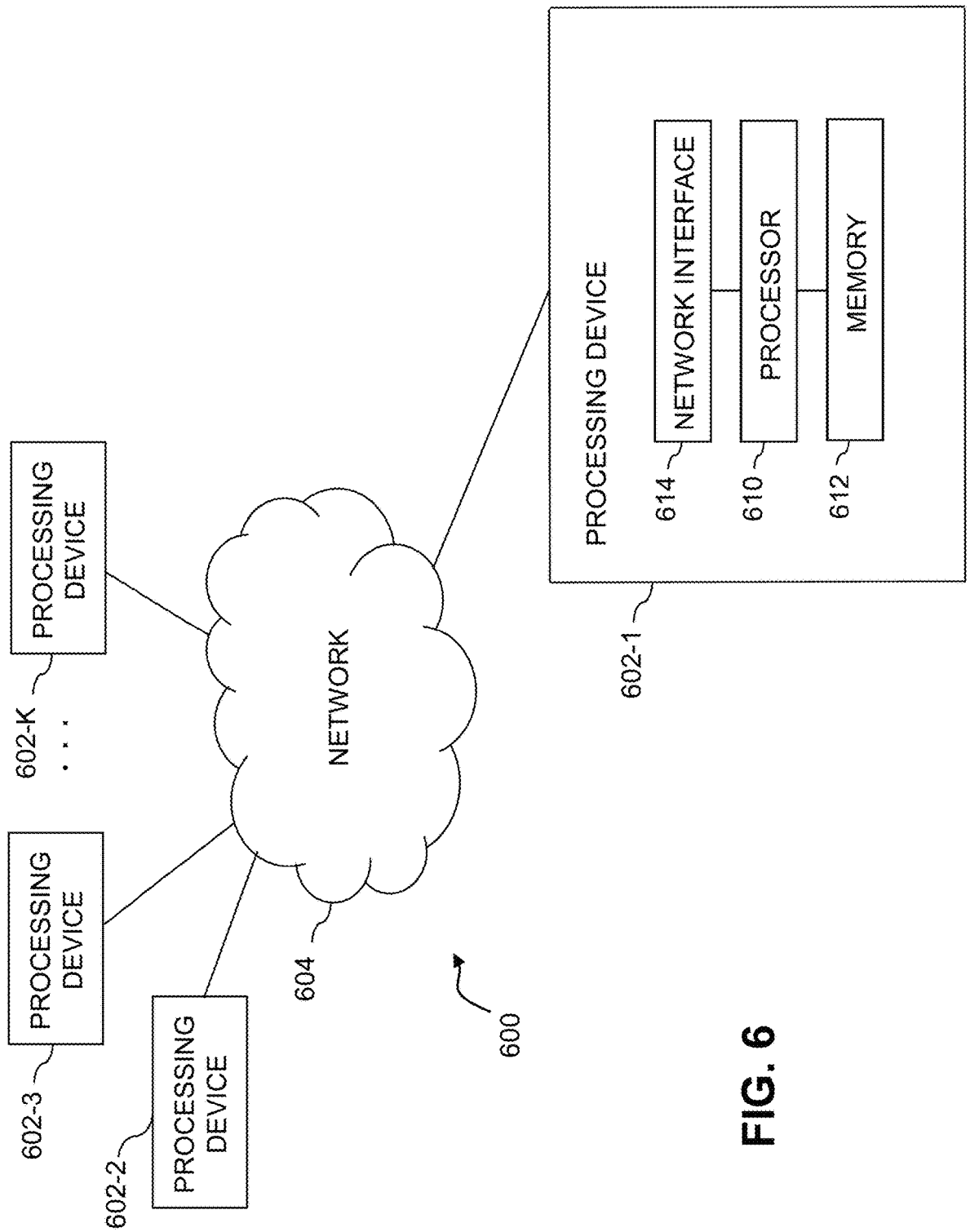

Other slice processing units 112 of the signature generator 200 are assumed to be configured in a manner similar to that shown in the figure for the slice processing units 112-1 and 112-N. The variables N, n and m in this embodiment, and similar variables elsewhere herein such as those in FIGS. 5 and 6, are considered arbitrary integers greater than or equal to two.

As noted above, each of the slice processing units 112-1 through 112-N combines the slice signatures at the outputs of its respective CRC32 units 202 using its corresponding instance of commutative function modules 204.

Examples of commutative functions that may be used in the commutative function modules 204 in this embodiment include without limitation exclusive-or ("XOR") functions and modulo addition functions, although numerous other types of commutative functions could be used, as will be readily apparent to those skilled in the art.

The central processing unit 114 of storage controller 110 in this embodiment implements a commutative function module 206 for combining the combined slice signatures from the multiple slice processing units 112-1 through 112-N to generate the final signature. The commutative function implemented by module 206 may be the same commutative function utilized in the modules 204 of the respective slice processing units 112. Accordingly, it may be an XOR function, a modulo addition function or another type of commutative function that is the same as the commutative function implemented in each of the modules 204. Alternatively, in some embodiments a different commutative function may be used in module 206 than that used in modules 204. As mentioned previously, a wide variety of different types of commutative functions may be used in illustrative embodiments herein, and such embodiments are not limited in this regard. Similarly, the particular types of CRC functions or other cryptographic hash functions used in illustrative embodiments can be varied in other embodiments.

As noted above, the storage system 106 implementing signature generator 200 of FIG. 2 is assumed to comprise a content addressable storage system. For example, the content addressable storage system may comprise an XtremIO™ storage array suitably modified to incorporate signature-based data verification techniques as disclosed herein. In an arrangement of this type, the storage controller 110 comprises a distributed storage controller comprising control modules ("C-modules"), data modules ("D-modules") and routing modules ("R-modules") of the XtremIO™ storage array. Separate instances of such processing modules can be associated with each of a plurality of storage nodes in a clustered storage system implementation.

The distributed storage controller further comprises one or more management modules including at least one system-wide management module ("SYM module") of the XtremIO™ storage array, although the distributed storage controller can comprise other types and arrangements of control modules, data modules, routing modules and management modules in other embodiments.

With reference to the signature generator 200, the slice processing units 112 are illustratively implemented as respective C-modules of the XtremIO™ storage array, and the central processing unit 114 is illustratively implemented as a SYM module of the XtremIO™ storage array.

In the above-described XtremIO™ storage array example, the SYM module of the distributed storage controller may be configured to group consecutive pages into page groups, to arrange the page groups into slices, and to assign the slices to different ones of the C-modules.

The D-module allows a user to locate a given user data page based on its corresponding page identifier.

As mentioned previously, a set of data for which a signature is generated by the signature generator 200 may comprise a set of pages of data. For example, each page illustratively comprises a contiguous set of addresses in a storage volume. A possible page size in the XtremIO™ storage array is 16 kilobytes (KB). A 10 gigabyte (GB) storage volume would therefore be broken up into 655360 pages. Consecutive pages are grouped together into a group referred to as "sub-lun" that typically has a size of 4 megabytes (MB). The above-noted 10 GB storage volume would therefore include 2560 sub-luns.

A given slice groups non-contiguous sub-luns together. For example, each storage volume is illustratively composed of 1024 slices, regardless of the size of that storage volume. Sub-luns are arranged into the slices by assigning the first sub-lun to the first slice, the second sub-lun to the second slice, and so on up to the 1024th slice. The 1025th sub-lun is then assigned to the first slice, the 1026th sub-lun is assigned to the second slice, and so on up to the 2048th slice. This process continues in a similar manner until all the remaining sub-luns in the storage volume have been assigned to slices.

Each page of data has a content-based page identifier ("Page ID") that is a cryptographic hash of the data content of that page. Accordingly, pages that include the same data will have the same Page ID.

Each page of data also has a page address, which is the address of the page in its storage volume.

The storage volume has a logical capacity and physical capacity. The logical capacity of the storage volume is the configured capacity of that storage volume, and the physical capacity of the storage volume is the actual amount of data stored in that storage volume. Pages which are all zeros are generally not stored. For example, a 10 GB storage volume would have a logical capacity of 10 GB. If a host had written only 2 GB of data to that storage volume, then it would have a physical capacity of 2 GB.

For further description below, it is assumed without limitation that the slice processing modules 112 comprise respective C-modules and that the central processing unit 114 comprises a SYM module. The storage system 106 is assumed to be XtremIO™ storage array suitably modified to implement signature-based data verification using the signature generator 200 illustrated in FIG. 2.

Different C-modules are assigned different portions of the data of a given storage volume. Each C-module may be assigned one or more slices from each of the storage volumes of the system. Because a given slice holds pages from different parts of the given storage volume, processing reads and writes to that storage volume tend to be spread evenly across the C-modules. The signature generator 200 of FIG. 2 is advantageously configured such that the load to calculate the signature is also evenly spread across all of the C-modules.

Each C-module of the content addressable storage system is generally assigned an entire slice, such that slices are not split between C-modules. However, it is possible that on one system slices X and Y may be owned by a single C-module, but on another system slices X and Y may be owned by two different C-modules.

The C-modules that are assigned the slices are separate from the D-modules that hold the data in those slices. The C-modules also hold the Page IDs for pages in the slices assigned to those C-modules.

Pages that have never been written to ("all-zero pages") are treated differently in this embodiment of a content addressable storage system in that such pages do not have Page IDs. This saves space in the content addressable storage system because most storage volumes each have a logical capacity that is much larger than its physical capacity. However, a host read of one of these pages will return all zeros, the same data that would have been returned if the host had actually written zeros to the page.

In order to determine whether two storage volumes, or two sets of storage volumes, have the same data, a signature is generated for each of the storage volumes or sets of storage volumes using the signature generator 200 of FIG. 2. If the signatures are the same then the two storage volumes, or two sets of storage volumes, have the same set of data.

The signatures as generated using the technique illustrated in FIG. 2 have the advantage of exhibiting good uniformity so as to lessen the probability of collisions which produce false positives.

Using the signature generator 200, a slice signature is calculated for each slice of a given storage volume. This process may be more particularly implemented in the present embodiment using the following equation:

$$\text{SliceSignature}=\text{hash}(\text{concat}(\text{VolumeID},\text{PageAddress}_0, \text{PageID}_0,\text{PageAddress}_1,\text{PageID}_1, \ldots \text{PageAddress}_n,\text{PageID}_n)).$$

In this equation, "hash" denotes a cryptographic hash function, such as the CRC32 function utilized in the CRC32 units 202, and "concat" denotes a concatenation function. A given Page ID and its corresponding Page Address are collectively referred to herein as a "page identifier and page address pair" of the corresponding slice.

Volume ID is an example of an identifier of a set of data and such an identifier need not be used when generating a signature for a single storage volume. However, Volume ID is used when generating a signature for a set of storage volumes, as will be described in more detail below, so it is included in the example equation. It should be noted that usage of the variable n is different in this context than its usage in one or more other contexts herein.

It is also important to note that the two volumes being compared in this embodiment must have the same Volume ID, even if they are on different storage systems, otherwise the signatures will not be the same.

The Page Addresses in the above equation are used to prevent identifying two volumes as having the same data when they contain the same pages, but at different addresses. For example, consider two storage volumes each containing only a single page having the same data and therefore the same Page ID. However, assume that these pages are at different locations in the storage volume. For example, this might occur if there was an error in copying a page between two storage volumes and the page was written to the wrong address in the target storage volume. If the Page Addresses are not included as part of the slice signature then these storage volumes would still have the same signature.

The CRC32 function utilized in CRC32 units 202 of signature generator 200 is a lightweight function that can be executed quickly. Although it is a linear function, it is sensitive to location of the input. Thus, switching the position of two pages in the above equation would result in a different CRC32 output. Unlike a CRC function, the XOR function or modulo addition function utilized in some implementations of commutative function modules 204 does not exhibit this sensitivity to location of its input.

As mentioned previously, all-zero pages are treated differently than other pages in the content addressable storage system. Such all-zero pages include not only pages that have never been written to, but also pages that a host has specifically written zeros to. Whenever an all-zero page is detected in the signature generation process, it is skipped and does not contribute to the signature calculation. This advantageously increases the efficiency of the signature calculation. More particularly, the calculation of the signature in an embodiment that handles all-zero pages in this manner is dependent only on the physical capacity of the storage volume instead of its typically much larger logical capacity.

After a signature is calculated for each slice using the CRC32 units 202, the slice signatures are combined using the commutative function modules 204. Since different slice signatures are illustratively computed on different C-modules, the slice signature calculations will typically be done in random order. This is especially true when comparing the storage volumes on storage systems that have different numbers of C-modules and therefore a potentially much different mapping of slices to C-modules.

One possible way to combine the slice signatures together would be for the SYM module to hash the slice signatures from the C-modules in order, from slice 0 to slice n. However, each C-module might then have to hold the slice signatures it generates, since the slice signatures cannot be combined together until all the slice signatures have been completed. In addition, all the individual slice signatures must be sent to the SYM module.

Instead, the SYM module in the present embodiment utilizes commutative function module 206 to combine the slice signatures together using a commutative function, such as an XOR function or a modulo addition function (e.g., addition mod 232). Each C-module can therefore combine the slice signatures for its assigned slices as those slice signatures are completed and then send back to the SYM module a single combined slice signature for all of its slices. The SYM module utilizes the same commutative function as the C-modules to combine the combined slice signatures from respective ones of the C-modules, as those combined slice signatures are received, in order to generate the final signature for the storage volume. Other embodiments can use different commutative function arrangements than those described above for the C-modules and/or the SYM module.

Portions of the foregoing description of illustrative embodiments in the content addressable storage system context referred to generation of a signature for a single storage volume. However, the corresponding techniques can be readily extended in a straightforward manner to generate signatures for sets of storage volumes or for other sets of data.

As indicated above, slices go across storage volumes, so if a C-module is assigned slice X, it will be assigned slice X for all storage volumes. Therefore each C-module calculates the slice signature for all storage volumes in the set of storage volumes across all the slices assigned to that C-module. It uses the same commutative function to combine the slice signatures from different storage volumes as it did for a single storage volume. The SYM module similarly uses its commutative function to combine the single combined slice signature from each of the C-modules, as those combined slice signatures are received, in order to generate the final signature for the set of storage volumes.

As mentioned previously, the references above to C-modules and SYM modules of an XtremIO™ storage array should be understood as examples of what are more generally referred to herein as "slice processing units" and a "central processing unit" of a storage controller such as storage controller 110 or 130. Other types and arrangements of slice processing units and central processing units can be used in other embodiments.

Each of the first site 102 and second site 122 in the FIG. 1 embodiment is assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controllers 110 and 130 or various components thereof can each be implemented in the form of one or more LXCs running on one or more VMs. Other arrangements of one or more processing devices of a processing platform can be used to implement the storage controllers 110 and 130 and/or their respective components. Other portions of the system 100 can similarly be implemented using one or more processing devices of at least one processing platform.

The first site 102 and second site 122 are illustratively implemented on respective distinct processing platforms, although numerous other arrangements are possible. For example, in some embodiments at least portions of the first site 102 and the second site 122 may be implemented on the same processing platform. The term "processing platform" as used herein is intended to be broadly construed so as to encompass, by way of illustration and without limitation, multiple sets of processing devices and associated storage systems that are configured to communicate over one or more networks.

It is to be appreciated that these and other features of illustrative embodiments are presented by way of example only, and should not be construed as limiting in any way.

Accordingly, different numbers, types and arrangements of system components such as first and second sites 102 and 122 and their respective storage systems 106 and 126 and storage controllers 110 and 130 can be used in other embodiments.

It should therefore be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments a given content addressable storage system or other type of storage system with functionality for automatic verification of asynchronously replicated data can be offered to cloud infrastructure customers or other users as a PaaS offering.

The operation of the information processing system 100 will now be described in further detail with reference to the flow diagram of the example embodiment of FIG. 3. The process as shown includes steps 300 through 304, and is suitable for use in the system 100 but is more generally applicable to other types of information processing systems in which one or more storage systems implement a signature-based data verification process. The process can be implemented in one of the storage systems 106 or 126 of the respective first site 102 and second site 122. Alternatively, portions of the process can be implemented in different ones of the storage systems 106 and 126. For example, a signature generated by storage system 106 can be verified in storage system 126, or vice versa.

In step 300, each of a plurality of slice processing units of the storage system generates slice signatures for slices of a first set of data assigned to that slice processing unit, combines the slice signatures using a commutative function, and sends the combined slice signatures to a central processing unit of the storage system.

The first set of data illustratively comprises a set of pages with each page having a content-based page identifier and a page address. For example, the first set of data may comprise a particular LUN or other storage volume of the storage system 106, or a set of multiple such storage volumes. It is assumed that consecutive pages of the first set of data are grouped into page groups, with the page groups being arranged into slices, and the slices being assigned to different ones of the slice processing units of the storage system. Each of the slice processing units is configured to generate slice signatures for each of the slices of the first set of data that are assigned to that slice processing unit, and to combine the slice signatures using a commutative function. The output of a given one of the slice processing units therefore comprises combined slice signatures for the slices assigned to that slice processing unit.

In step 302, the central processing unit of the storage system combines the combined slice signatures received from the slice processing units using a commutative function to generate a first signature for the first set of data.

The central processing unit therefore generates the first signature for the first set of data by combining the combined slice signatures from the multiple slice processing units, also using a commutative function.

The commutative function utilized by the central processing unit in combining the combined slice signatures from the multiple slice processing units can be the same commutative function utilized by the slice processing units in generating their respective combined slice signatures. Alternatively, different commutative functions may be used in the central processing unit and the slice processing units.

In step 304, the storage system verifies equivalence between the first set of data and a second set of data by comparing the first signature to a second signature generated for the second set of data. The second signature may be generated in the same storage system that generates the first signature, or in a different storage system. The second set of data may therefore be stored in the storage system 106 with the second signature being generated by the storage controller 110. Alternatively, the second set of data may be stored in the storage system 126 of the second site 122 with the second signature being generated by a similar signature generator implemented by the slice processing units 132 and central processing unit 134 of the storage controller 130 of second site 122.

Figure 3:
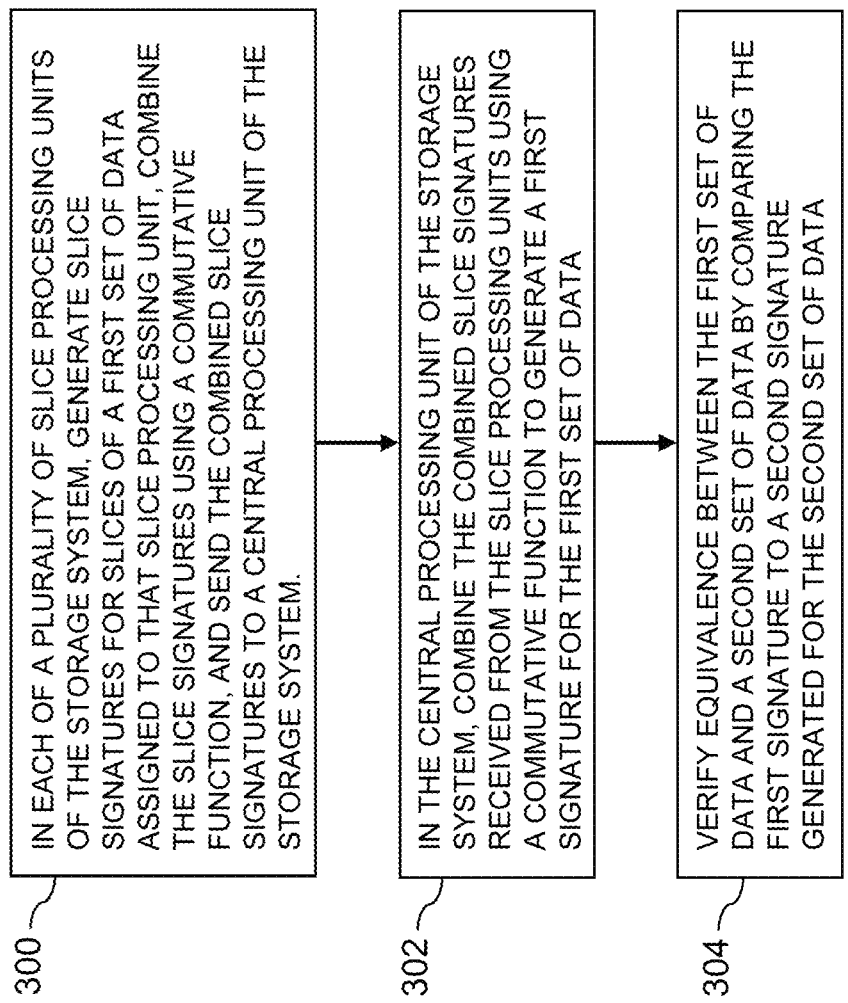
FIG. 3 is a flow diagram of a process for generating a signature for use in comparing sets of data in an illustrative embodiment.

The FIG. 3 process can be used to verify that data has been transferred correctly from one site to another, based on the expectation that the data will be the same in both sites if the transfer was done correctly. The process can therefore be used to detect when something has gone wrong in the data transfer process, resulting in storage volumes or other sets of data that should be equivalent but instead include different data.

As noted above, in some embodiments the storage system that generates a signature comprises a storage system of a target site and the first set of data comprises data replicated from a different storage system of a source site in accordance with a cycle-based asynchronous replication process. In embodiments of this type, the signatures of the first and second sets of data are compared as part of a data verification phase of at least one of the cycles of the cycle-based asynchronous replication process.

For example, as indicated previously, the signature-based data verification in some embodiments disclosed herein illustratively involves selecting a particular target site snapshot, and then verifying the data in that snapshot over multiple cycles through the comparison of target site signatures for different portions of the selected target site snapshot to corresponding source site signatures. This data verification is separate from the transferring of the data in cycles. The data transferred each cycle comprises the above-noted delta between two snapshots taken at respective ones of two different points in time. The deltas sent from the source site to the target site are not verified in each cycle. A more detailed example of such a process will be described below in conjunction with FIG. 4.

Steps 300, 302 and 304 of the FIG. 3 process can be repeatedly iterated as needed, in order to perform substantially continuous verification as additional data is replicated, migrated or otherwise copied or transferred.

In the context of the FIG. 1 embodiment, the steps 300, 302 and 304 are illustratively performed by at least one of the storage controllers 110 or 130 of the storage systems 106 or 126. For example, the steps of the process may be performed by slice processing units 112, central processing unit 114 and data verifier 116 of the first site 102, possibly interacting with slice processing units 132, central processing unit 134 and data verifier 136 of the second site 122. Such interaction illustratively includes performing various operations or other functions associated with initiating and managing one or more replication processes, migration processes or other type of processes involving copying or transfer of data and associated verification of copied or transferred data.

It is also to be appreciated that the FIG. 3 process and other features and functionality for signature-based data verification as described above can be adapted for use with other types of information systems, including by way of example an information processing system in which multiple storage system sites are implemented on the same processing platform.

The particular processing operations and other system functionality described in conjunction with the flow diagram of FIG. 3 are presented by way of illustrative example only, and should not be construed as limiting the scope of the disclosure in any way. Alternative embodiments can use other types of processing operations involving automatic verification of asynchronously replicated data. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automatic verification processes for respective different storage systems of a given information processing system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 130 that is configured to control performance of steps 300, 302 and 304 of the FIG. 3 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 130, as well as other system components, may be implemented at least in part using processing devices of such processing platforms. For example, in a distributed implementation of the storage controller 130, respective distributed modules of such a storage controller can be implemented in respective LXCs running on respective ones of the processing devices of a processing platform. Storage controller 110 can be implemented in a similar manner.

Additional illustrative embodiments will now be described with reference to the example cycle-based asynchronous replication process of FIG. 4. More particularly, FIG. 4 shows an example of cycle-based asynchronous replication of data with automatic verification in an illustrative embodiment. In this embodiment, first and second sites 102 and 122 are more specifically referred to as respective source and target sites.

Figure 4:
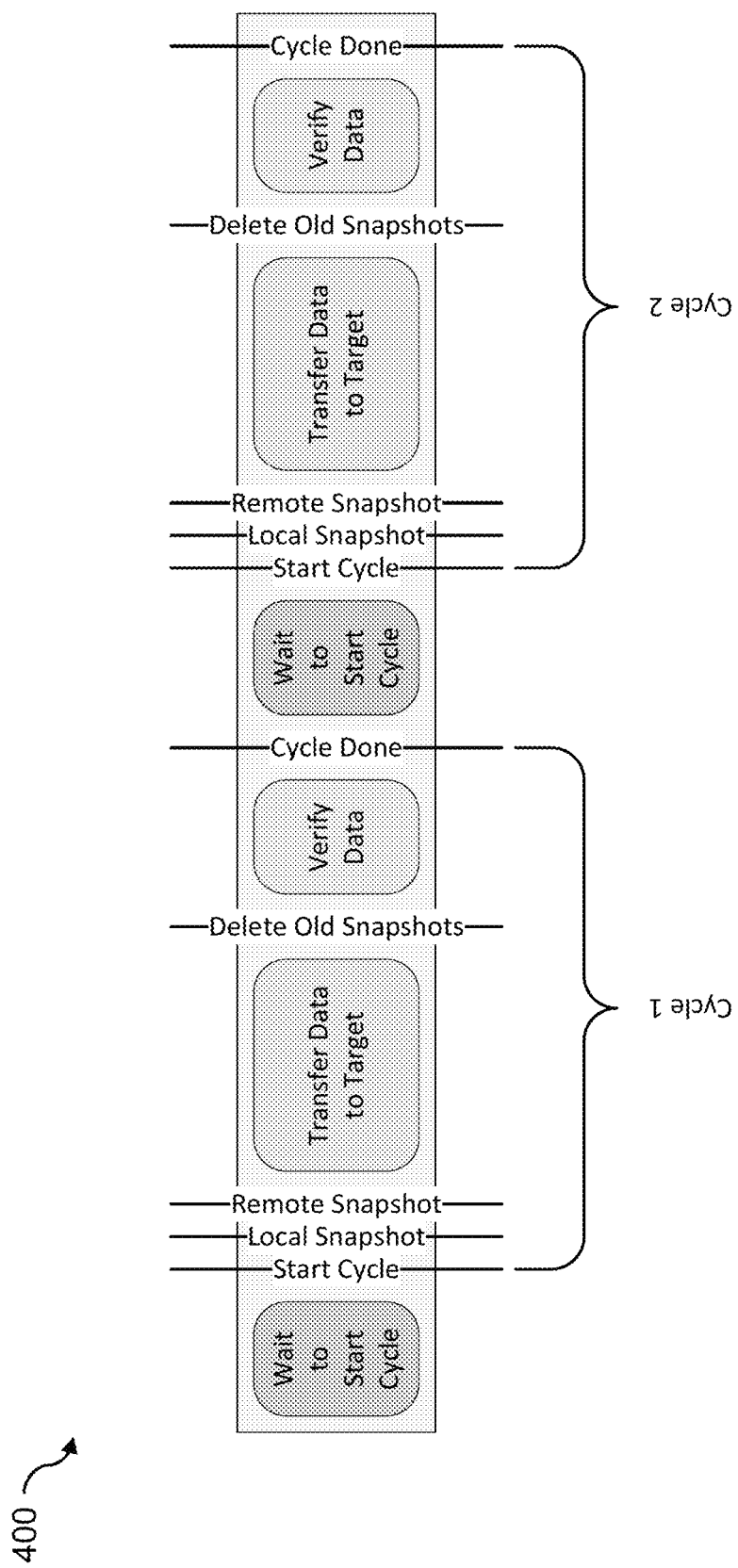
FIG. 4 shows an example of cycle-based asynchronous replication of data between a source site and a target site with automatic verification using signatures generated in accordance with the process of FIG. 3 in an illustrative embodiment.

A portion 400 of the cycle-based asynchronous replication process illustrated in FIG. 4 includes two full cycles, denoted Cycle 1 and Cycle 2. At the beginning of each cycle, source site and target site snapshots are taken of the respective source and target data by respective source site and target site snapshot generators, implemented in respective storage controllers 110 and 130 of FIG. 1. The source site and target site snapshots in this embodiment are referred to in the figure as respective "local" and "remote" snapshots. The differential data or delta is then transferred from the source site to the target site, and any old snapshots that are no longer needed are deleted. There is a data verification phase located between the deletion of old snapshots and the end of the cycle, followed by a waiting period before the start of the next cycle, as illustrated in the figure. Additional cycles of the process are assumed to be configured in a manner similar to that illustrated for Cycle 1 and Cycle 2 in the figure.

In this particular example, the local snapshot taken at the source site for Cycle 2 contains the same data used to generate the local snapshot for Cycle 1, plus whatever additional data was written by the source site production servers to the source site storage system during Cycle 1 and its post-cycle waiting period. The delta to be transferred from the source site to the target site during Cycle 2 is therefore generated as the differential data between the local snapshot for Cycle 1 and the local snapshot for Cycle 2. The target site receives this delta transferred during Cycle 2 and utilizes it to update its remote snapshot. As a result, at the end of Cycle 2, the local snapshot for Cycle 2 at the source site and the updated remote snapshot for Cycle 2 at the target site should be equal. This situation is confirmed by the target site using replicated data verification of the type previously described herein.

The example of FIG. 4 illustrates one possible technique for implementing the replicated data verification in this embodiment. As indicated above, each of Cycle 1 and Cycle 2 in portion 400 of the cycle-based asynchronous replication process includes a data verification phase located between the deletion of old snapshots and the end of the cycle.

In this data verification phase, a signature of a portion of a selected target site snapshot is compared to a signature of the same portion of the corresponding source site snapshot to confirm that the portions are the same. Only a portion of the selected target site snapshot is verified in each cycle, such that it takes multiple cycles of the cycle-based asynchronous replication process in order to complete the full verification of the selected target site snapshot. Each of the signatures may comprise a checksum, hash or other signature generation function of the particular portion of the target site or source site snapshot to which it corresponds. Combinations of checksums, hashes and other signature generation functions can be used in other embodiments. The exact signature algorithm used can vary depending upon the specific needs of a given implementation, as will be appreciated by those skilled in the art.

The FIG. 4 embodiment therefore verifies the transferred data by periodically selecting a target site snapshot and confirming that the data it contains is the same as that of its corresponding source site snapshot. However, this verification proceeds over multiple cycles of the cycle-based asynchronous replication process, with different portions of the target site and source site snapshots being compared based on their respective signatures in different data verification phases of the multiple cycles. Such an approach advantageously avoids the aforementioned problems that would otherwise be associated with attempting to verify all of the transferred data within the same cycle in which it was transferred. For example, the cycles can be made much more compact than would otherwise be possible, thereby reducing the lag time between the source site data and the replicated data at the target site. This also facilitates the achievement of desired recover point objectives.

The verification of the data transferred within a given one of the cycles of the FIG. 4 embodiment can be distributed over multiple ones of the cycles in a variety of different ways, as previously indicated for other embodiments herein.

For example, the different portions of the selected target site and source site snapshots for which the verification is spread over the multiple cycles may comprise respective percentages of the designated target site and source site snapshots. As a more particular example, if different portions each comprising 25% of the selected target site and source site snapshots were verified in each cycle, then it would take a total of four cycles to verify the selected pair of snapshots, but the adverse effect on the lag time would be much smaller than it would be if the pair of snapshots were verified in a single cycle.

Other fixed percentages of the selected target site and source site snapshots may be verified in each of multiple cycles. For example, the target site and source site signatures for different n percent portions of the designated target site and source site snapshots may be verified in each of 100/n of the cycles.

In such arrangements, a fixed percent of the selected target site and source site snapshots are verified each cycle. For example, at 10% it would take 10 cycles to completely verify a pair of snapshots. It is also possible that different percentages of the designated target site and source site snapshots may be utilized in different ones of the multiple cycles.

Other examples include various timed and adaptive arrangements.

For example, a given timed arrangement attempts to verify a pair of snapshots in a fixed amount of time. This illustratively involves determining the number of cycles that are expected to be run in the time period, and dividing 100% by the number of cycles to get the percentage of the snapshots that must be verified each cycle in order for the pair to be fully verified within the time period.

Numerous other timed arrangements can be configured in which the different portions of the selected target site and source site snapshots for which the verification is spread over the multiple cycles are dynamically adapted over time in order to control the lag time.

In one possible adaptive arrangement, the percentage of snapshots verified in each cycle is adapted in order to limit the impact on the lag time. For a current one of the multiple cycles, this illustratively involves calculating a verification rate (e.g., percentage/second) as a function of a time elapsed for verification of a given one of the portions in a previous one of the multiple cycles, and calculating an amount of time remaining in a recover point objective period for the current cycle. The verification rate is then multiplied by the amount of time remaining in the recover point objective period for the current cycle to determine a particular portion of the designated target site and source site snapshots to be verified in the current cycle. If the particular portion determined by multiplying the verification rate by the amount of time remaining in the recover point objective period for the current cycle is less than a specified minimum portion, the minimum portion is verified in the current cycle. This minimum portion is utilized to ensure that the even if the recover point objective is being exceeded at the moment, the data verification proceeds and eventually finishes.

It is to be appreciated that the particular cycle configuration and associated process operations as shown in FIG. 4 are examples only, and numerous alternative cycle-based asynchronous replication processes can be used in other embodiments. For example, the placement of the data verification phase within each of the cycles of the cycle-based asynchronous replication process can be varied in other embodiments.

Some embodiments may alternatively be configured such that the data verification for a given set of replicated data is performed within the corresponding cycle in which the data was transferred, rather than being spread over multiple distinct cycles in the manner described above in conjunction with FIG. 4.

Moreover, illustrative embodiments are not limited to the data replication context, and can be applied to data migration and in numerous other contexts in which efficient comparison of multiple sets of data is desirable.

Illustrative embodiments of information processing systems with functionality for signature-based data verification as disclosed herein can provide a number of significant advantages relative to conventional arrangements.

For example, some embodiments can advantageously provide significantly improved efficiency in signature-based verification of data replicated, migrated or otherwise copied or transferred from a source site to a target site of a given information processing system. These embodiments are therefore better able to achieve overall performance objectives for a given replication or migration process, and in numerous other contexts involving signature-based data verification.

Illustrative embodiments avoid the need to send all slice signatures individually from a set of distributed slice processing units to a central processing unit. Instead, each slice processing unit can combine the slice signatures it generates for its assigned slices and then send only the combined slice signature to the central processing unit. The central processing unit combines a relatively small number of combined slice signatures in order to generate the final signature for a given set of data. Only the final signatures for two sets of data are compared to determine if the sets of data are the same.

These and other embodiments advantageously distribute the signature generation processing load evenly over the slice processing units, therefore improving the efficiency of signature generation and associated data verification in a distributed content addressable storage system. There is no communication or transfer of data needed between the slice processing units with regard to the signature generation.

The processing load required to generate a given signature in some embodiments is dependent on the amount of actual data stored in a storage volume and not on its configured size. In other words, the processing load required to generate the given signature is a function of physical capacity rather than logical capacity. The signatures generated in some embodiments exhibit good uniformity and thereby lessen the probability of collisions which can produce false positives.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage systems 106 and 126, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines.

Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controllers 110 and 130 of the respective first and second sites 102 and 122 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, first and second sites, storage systems, storage devices and storage controllers. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices;
the plurality of storage devices being configured to store at least a first set of data;
the storage system being configured to generate a first signature for the first set of data and to verify equivalence between the first set of data and a second set of data by comparing the first signature to a second signature generated for the second set of data;
wherein the first and second sets of data comprise respective first and second sets of pages with each page having a content-based page identifier and a page address;
wherein the first and second signatures are generated utilizing respective functions of the page identifiers and page addresses of the respective first and second sets of pages;
the first signature being determined at least in part by applying a combination of the page identifiers and the page addresses of each of the pages in the first set as input to a first function; and
the second signature being determined at least in part by applying a combination of the page identifiers and the page addresses of each of the pages in the second set as input to a second function.

2. The apparatus of claim 1 wherein the first and second sets of data comprise one of:
respective first and second storage volumes; and
respective first and second sets of multiple storage volumes.

3. The apparatus of claim 1 wherein the second set of data is stored in one of:
the plurality of storage devices of the storage system; and
a plurality of storage devices of a different storage system.

4. The apparatus of claim 1 wherein the storage system comprises a storage system of a target site and the first set of data comprises data replicated from a different storage system of a source site in accordance with a cycle-based asynchronous replication process and wherein the signatures of the first and second sets of data are compared as part of a data verification phase of at least one of the cycles of the cycle-based asynchronous replication process.

5. The apparatus of claim 1 wherein the storage system comprises a storage system of a target site and the first set of data comprises data copied from a different storage system of a source site in accordance with a migration process.

6. The apparatus of claim 1 wherein the page identifiers are generated as respective cryptographic hash functions of the data in the respective corresponding pages.

7. The apparatus of claim 1 wherein the storage system is configured:
to detect pages in the first set of data that are all-zero pages; and
to generate the first signature for the first set of data without utilizing the detected all-zero pages.

8. The apparatus of claim 1 wherein the storage system is configured:
to group consecutive pages of the first set of data into page groups;
to arrange the page groups into slices; and
to assign the slices to different ones of a plurality of slice processing units of the storage system.

9. The apparatus of claim 8 wherein each of the slice processing units is configured:
to generate slice signatures for each of the slices of the first set of data that are assigned to that slice processing unit; and
to combine the slice signatures using a first commutative function.

10. The apparatus of claim 9 wherein the storage system is configured to generate the first signature for the first set of data by combining the combined slice signatures from the multiple slice processing units using a second commutative function.

11. The apparatus of claim 10 wherein at least one of the first and second commutative functions comprises at least one of an XOR function and a modulo addition function.

12. The apparatus of claim 9 wherein a given one of the slice signatures is generated as a cryptographic hash function of an identifier of the first set of data and a plurality of page identifier and page address pairs of the corresponding slice.

13. The apparatus of claim 12 wherein the identifier of the first set of data comprises a storage volume identifier.

14. The apparatus of claim 12 wherein the cryptographic hash function comprises a cyclic redundancy check function.

15. A method comprising:
generating a first signature for a first set of data; and
verifying equivalence between the first set of data and a second set of data by comparing the first signature to a second signature generated for the second set of data;
wherein the first and second sets of data comprise respective first and second sets of pages with each page having a content-based page identifier and a page address;
wherein the first and second signatures are generated utilizing respective functions of the page identifiers and page addresses of the respective first and second sets of pages;
the first signature being determined at least in part by applying a combination of the page identifiers and the page addresses of each of the pages in the first set as input to a first function;
the second signature being determined at least in part by applying a combination of the page identifiers and the page addresses of each of the pages in the second set as input to a second function; and
wherein the method is implemented in a storage system comprising a plurality of storage devices configured to store at least the first set of data.

16. The method of claim 15 further comprising:
grouping consecutive pages of the first set of data into page groups;
arranging the page groups into slices; and
assigning the slices to different ones of a plurality of slice processing units of the storage system;
wherein each of the slice processing units is configured:
to generate slice signatures for each of the slices of the first set of data that are assigned to that slice processing unit; and
to combine the slice signatures using a first commutative function.

17. The method of claim 16 further comprising generating the first signature for the first set of data by combining the combined slice signatures from the multiple slice processing units using a second commutative function.

18. A computer program product comprising a non-transitory processor-readable storage medium having stored therein program code of one or more software programs, wherein the program code when executed by a storage system comprising a plurality of storage devices causes said storage system:
to generate a first signature for a first set of data stored in the plurality of storage devices; and
to verify equivalence between the first set of data and a second set of data by comparing the first signature to a second signature generated for the second set of data;
wherein the first and second sets of data comprise respective first and second sets of pages with each page having a content-based page identifier and a page address; and
wherein the first and second signatures are generated utilizing respective functions of the page identifiers and page addresses of the respective first and second sets of pages;
the first signature being determined at least in part by applying a combination of the page identifiers and the page addresses of each of the pages in the first set as input to a first function; and
the second signature being determined at least in part by applying a combination of the page identifiers and the page addresses of each of the pages in the second set as input to a second function.

19. The computer program product of claim 18 wherein the program code when executed by the storage system further causes said storage system:
to group consecutive pages of the first set of data into page groups;
to arrange the page groups into slices; and
to assign the slices to different ones of a plurality of slice processing units of the storage system;
wherein each of the slice processing units is configured:
to generate slice signatures for each of the slices of the first set of data that are assigned to that slice processing unit; and
to combine the slice signatures using a first commutative function.

20. The computer program product of claim 19 wherein the program code when executed by the storage system further causes said storage system to generate the first signature for the first set of data by combining the combined slice signatures from the multiple slice processing units using a second commutative function.

* * * * *